S. C. GARDNER.
Vehicle Wheels.

No. 148,880. Patented March 24, 1874.

WITNESSES.
E. Wolff
O. Sedgwick

INVENTOR.
S. C. Gardner
BY
Munn & Co.
ATTORNEYS.

AM. PHOTO-LITHOGRAPHIC CO. N.Y. (OSBORNE'S PROCESS.)

UNITED STATES PATENT OFFICE.

STEPHEN C. GARDNER, OF EAGLEVILLE, CONNECTICUT.

IMPROVEMENT IN VEHICLE-WHEELS.

Specification forming part of Letters Patent No. 148,880, dated March 24, 1874; application filed December 18, 1873.

*To all whom it may concern:*

Figure 1:
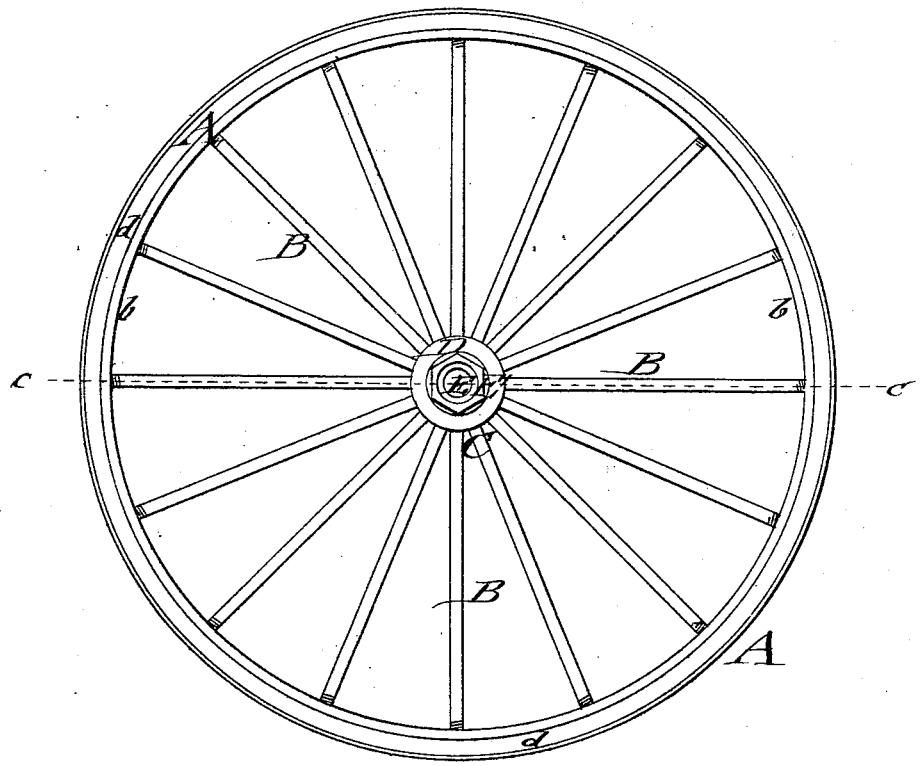
Figure 2:
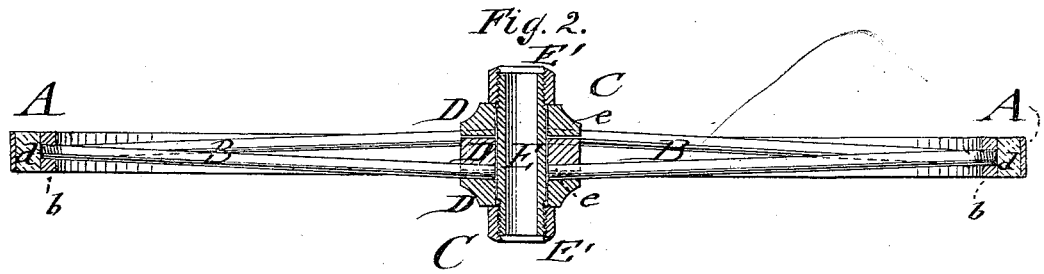
Figure 3:
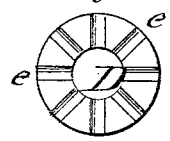

Be it known that I, STEPHEN C. GARDNER, of Eagleville, in the county of Tolland and State of Connecticut, have invented a new and Improved Wheel, of which the following is a specification:

In the accompanying drawing, Figure 1 represents a front view of my improved wheel for vehicles of all kinds; Fig. 2, a horizontal central section of the same on the line *c c*, Fig. 1; and Fig. 3, a side view of part of the hub-socket detached.

Similar letters of reference indicate corresponding parts.

The invention will first be fully described and then pointed out in the claims.

My invention consists of an inner and outer tire, which are cushioned off by a felly of suitable material between them, and sustain the spokes, in connection with grooved central and side socket-rings of the hub.

In the drawing, A represents the outer tire of the wheel; *b*, an inner stronger tire of iron, steel, or other suitable metal; and *d*, a felly placed between them, which may be made of wood, paper, india-rubber, or other material. This felly forms a cushion between the rims, and prevents any jars from coming on the spokes. The spokes B are to be made either of wood, iron, or steel, hollow or solid, and are fastened by their outer screw ends into corresponding perforations of the inner rim *b*. The inner end of spokes B is socketed into hub C, which is constructed of three sections or rings, D, a central one and two outer ones. The central ring D is provided at both sides with semicircular grooves *e*, of which the grooves of one side are placed intermediately between those of the other side, so that one-half of the spokes may be socketed into one side of the central ring, while the alternating other half of them is inserted into the intermediate grooves at the opposite side of ring D. The outer rings D are provided with similar semicircular grooves *e*, corresponding exactly to those of the central ring, embracing thereby the spokes, and giving a firm support to them. The rings D are placed on a sleeve or box, E, and firmly bound together by screw-nuts E', which turn on threads at the ends of box E.

The hub is placed over the axle and protected against the entering of dust by suitable clasps or covering. Any part of the wheel may be taken out and replaced if broken or injured, by detaching the screw-nuts of the hub, and the rest of the wheel serving, on the replacing of the spoke, hub-section, or tire, as before, and forming thereby a wheel which may be shipped, taken to pieces, repaired, and be put together without difficulty, while the strong construction of the parts secures durability and compactness. When the wooden spoke is employed, I hold it at the outer end by fitting it into a socket bolted on the inner rim.

Having thus described my invention, I claim as new and desire to secure by Letters Patent—

1. The combination, with the ordinary tire A and wooden felly *d*, of an inner tire, *b*, having threaded sockets at intervals around it, and a series of spokes, B, end-threaded, and screwed into said sockets, as and for the purpose described.

2. The combination, with spokes B, of sleeve E, caps E', and a hub consisting of three sections, D, relatively grooved on their opposite faces, as and for the purpose specified.

STEPHEN C. GARDNER.

Witnesses:
ALBERT KNIGHT,
A. FRANK KNIGHT.